(12) United States Patent
Arai et al.

(10) Patent No.: US 10,788,172 B2
(45) Date of Patent: Sep. 29, 2020

(54) GLASS PLATE

(71) Applicant: AGC Inc., Chiyoda-ku (JP)

(72) Inventors: Yusuke Arai, Chiyoda-ku (JP); Naoya Wada, Chiyoda-ku (JP); Hiroyuki Hijiya, Chiyoda-ku (JP); Tetsuya Nakashima, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 331 days.

(21) Appl. No.: 15/801,540

(22) Filed: Nov. 2, 2017

(65) Prior Publication Data

US 2018/0066814 A1  Mar. 8, 2018

Related U.S. Application Data

(63) Continuation of application No. PCT/JP2016/063408, filed on Apr. 28, 2016.

(30) Foreign Application Priority Data

May 13, 2015 (JP) .................. 2015-098558

(51) Int. Cl.
*C03C 3/087* (2006.01)
*F21S 2/00* (2016.01)
(Continued)

(52) U.S. Cl.
CPC ................ *F21S 2/00* (2013.01); *C03C 3/085* (2013.01); *C03C 3/087* (2013.01); *C03C 3/095* (2013.01);
(Continued)

(58) Field of Classification Search
CPC . F21S 2/00; C03C 3/095; C03C 3/085; C03C 3/091; C03C 4/00; G02B 6/0023; F21K 9/61
See application file for complete search history.

(56) References Cited

U.S. PATENT DOCUMENTS

2009/0242809 A1  10/2009  Choju et al.
2011/0274916 A1  11/2011  Murata
(Continued)

FOREIGN PATENT DOCUMENTS

JP  2012-144435  8/2012
JP  2015-72896   4/2015
(Continued)

OTHER PUBLICATIONS

International Search Report dated Jul. 19, 2016 in PCT/JP2016/063408, filed on Apr. 28, 2016 (With English Translation).
(Continued)

*Primary Examiner* — Noah S Wiese
(74) *Attorney, Agent, or Firm* — Oblon, McClelland, Maier & Neustadt, L.L.P.

(57) ABSTRACT

A glass plate, with a thickness θ of 1.0 mm or more, having first and second main surfaces and end surfaces, includes 1 to 80 weight ppm of iron in terms of $Fe_2O_3$ with 0.1 to 10.0 weight ppm of $Fe^{2+}$; and 0.1 to 10.0 weight ppm of Ni, Mn, Cr, Co and V in total. In a sample with a size of 50 mm×50 mm×θ obtained from the glass plate, and an arithmetic average roughness of the main surfaces and first and second cut surfaces being 0.1 μm or less, a first average absorbance coefficient for a wavelength of 400 to 700 nm measured on the first main surface in a normal direction is 0.009 or less, and a ratio of a second average absorbance coefficient measured on the first cut surface, to the first absorbance coefficient is 1.3 or less.

18 Claims, 2 Drawing Sheets

(51) Int. Cl.
C03C 3/095 (2006.01)
F21V 8/00 (2006.01)
C03C 3/085 (2006.01)

(52) U.S. Cl.
CPC ......... *G02B 6/0023* (2013.01); *G02B 6/0065* (2013.01)

(56) References Cited

U.S. PATENT DOCUMENTS

| | | | | |
|---|---|---|---|---|
| 2013/0129947 | A1* | 5/2013 | Harvey | C03B 33/091 |
| | | | | 428/34.4 |
| 2015/0166405 | A1* | 6/2015 | Murata | C03C 3/083 |
| | | | | 428/410 |
| 2016/0002094 | A1 | 1/2016 | Lambricht et al. | |
| 2016/0083291 | A1* | 3/2016 | Dogimont | C03C 3/087 |
| | | | | 428/141 |

FOREIGN PATENT DOCUMENTS

| | | |
|---|---|---|
| WO | WO 2010/084670 A1 | 7/2010 |
| WO | WO 2014/128016 A1 | 8/2014 |
| WO | WO 2014/180679 A1 | 11/2014 |
| WO | WO 2015/033866 A1 | 3/2015 |

OTHER PUBLICATIONS

Written Opinion dated Jul. 19, 2016 in PCT/JP2016/063408, filed on Apr. 28, 2016.

* cited by examiner

GLASS PLATE

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/063408 filed on Apr. 28, 2016 and designating the U.S., which claims priority of Japanese Patent Application No. 2015-098558 filed on May 13, 2015. The entire contents of the foregoing application are incorporated herein by reference.

BACKGROUND OF THE INVENTION

1. Field of the Invention

The disclosure herein generally relates to a glass plate.

2. Description of the Related Art

Conventionally, edge light type display devices or edge light type illuminating devices that use low power consumption light sources, such as LEDs, have been known. In the edge light type display device or illuminating device, a light guide plate having two main surfaces opposite to each other, and a light source arranged facing one end surface of the light guide plate are used. The "end surfaces" of the light guide plate mean four side surfaces that connect two main surfaces of the light guide plate to each other. Moreover, among the four side surfaces, an end surface that faces the light source is especially referred to as an "incident end surface".

In an edge light type device, a light from a light source enters an incident end surface of a light guide plate. Afterwards, the light entering the light guide plate exits from one main surface (referred to as an "exit main surface"). Therefore, the edge light type device has a feature that a light incident direction and a light exit direction in the light guide plate are orthogonal to each other.

Typically, as the above-described edge light type light guide plate, an acrylic plate is used. However, an acrylic plate has a problem from the aspect of abrasion-resistance, stiffness, heat resistance and water resistance. Then, a glass plate in which such a problem is not liable to occur has been required to be used as a light guide plate.

Moreover, recently, in an exterior material for construction, an interior material such as a glass curtain or a glass rib, furniture such as a table or a shelf board, fixture, or the like, glass has become more and more popular in order to give a feel of high grade to design. Particularly, a high-transparency glass has been desired. In such a high-transparency glass, in order to emphasize its transparency in design, not only an appearance in the direction of the main surface of the plate but also an appearance in a normal direction to the end surface are important.

SUMMARY OF THE INVENTION

Technical Problem

As described above, as an edge light type light guide plate, use of a glass plate has been desired.

However, in an edge light type device, because a light entering the light guide plate propagates in the main surface direction inside the light guide plate maintaining a total reflection condition, a light path length until exiting from the light guide plate is longer than an actual size of the light guide plate. Therefore, when a typical glass plate is applied as the above-described light guide plate, there is concern that a considerable amount of the incident light is absorbed or scattered during propagation and light with sufficient intensity is not likely to exit from the exit main surface. Moreover, there is also concern that when a portion of a specific wavelength is selectively absorbed during the propagation, a light of different color from the incident light may be emitted. Even for existing high-transparency glass used as a cover glass for photovoltaic cell or the like, a similar concern remains. Further for the display device, such concern is expected to further become more noticeable for the display device with increases in size of the light guide plate.

The present invention aims at providing a glass plate that is also excellent in an optical characteristic in a normal direction to the end surface, such that when used as an edge light type light guide plate, a sufficient exit light amount can be obtained even in a long light path length, and a color deviation between an incident light and an exit light is significantly controlled.

Solution to Problem

The present invention provides a glass plate, having a length of a side L of 200 mm or more and a thickness θ of 1.0 mm or more, provided with first and second main surfaces; and one end surface or a plurality of end surfaces connecting the main surfaces to each other, including 1 weight ppm to 80 weight ppm of iron in a total amount in terms of $Fe_2O_3$, with 0.1 weight ppm to 10.0 weight ppm of $Fe^{2+}$ in terms of $Fe_2O_3$, and 0.1 weight ppm to 10.0 weight ppm of Ni, Mn, Cr, Co and V in total, in a sample "A", obtained by cutting from a central portion of the glass plate in a direction orthogonal to the first main surface, with a size having a length of 50 mm, a width of 50 mm and a thickness of θ, the two main surfaces and first and second cut surfaces that face each other being set to have an arithmetic average roughness Ra of 0.1 μm or less, a first average absorbance coefficient, $\alpha_{ave1}$, for a wavelength within a range of 400 nm to 700 nm measured on the first main surface in a normal direction to the first main surface being 0.009 or less, and a ratio of a second average absorbance coefficient, $\alpha_{ave2}$, for a wavelength within a range of 400 nm to 700 nm measured on the first cut surface in a direction orthogonal to the normal direction, to the first absorbance coefficient $\alpha_{ave1}$, $\alpha_{ave2}/\alpha_{ave1}$, being 1.3 or less.

Effect of the Invention

In the present invention, a glass plate, such that when used as an edge light type light guide plate, a sufficient exit light amount can be obtained even in a long light path length, and a color deviation between an incident light and an exit light is significantly controlled, can be provided.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

In the following, with reference to drawings, an embodiment of the present invention will be described.

Figure 1:
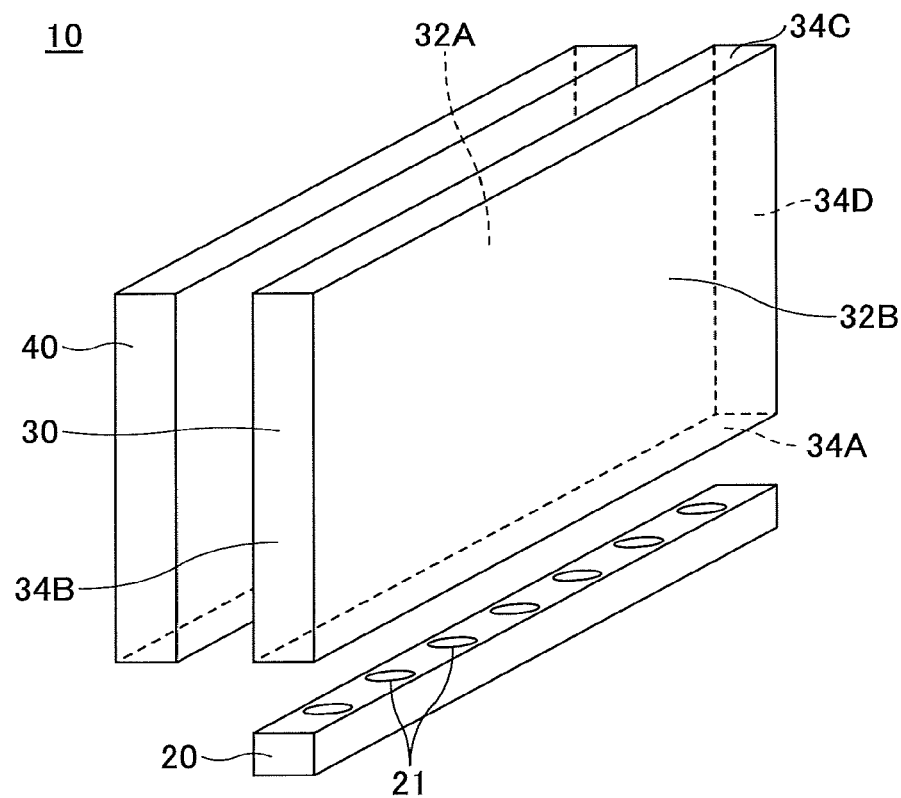
FIG. 1 is a diagram roughly depicting a configuration of a typical edge light type display device.

FIG. 1 is an exploded perspective view roughly depicting a typical edge light type display device.

As illustrated in FIG. 1, typically, the edge light type display device 10 includes a light source group 20, a light guide plate 30 and a display element 40.

The light source group 20 includes a light source or two or more light sources 21 arranged in an array. Each light source 21 may be a directional light source such as a light emitting diode (LED) or a laser diode.

The light guide plate 30 includes first and second main surfaces 32A and 32B, four end surfaces 34A to 34D that connect the main surfaces. The first main surface 32A of the light guide plate 30 is a light outgoing surface side, and also referred to as a "light outgoing main surface 32A". The second main surface 32B of the light guide plate 30 is a rear surface side of the display device 10. The end surface 34A of the light guide plate 30 faces the light source group 20, and is a light incident surface of the display device 10. Therefore, the end surface 34A of the light guide plate 30 is also referred to as a "light incident end surface 34A". In addition, between each of the main surfaces 32A and 32B and each of the four end surfaces 34A to 34D, or between the respective end surfaces, a chamfering surface or two or more chamfering surfaces may be present for connecting the respective surfaces.

The display element 40 is, for example, configured of a liquid crystal, and an optical filter, and can form an image. The display element 40 is arranged so as to face the first main surface 32A of the light guide plate. Moreover, in the case of an illuminating device, the display element 40 is omitted, or an optical filter or the like for compensating color tone is arranged as the display device 40.

The display device 10 having the above-described configuration operates as follows. First, from the respective light sources configuring the light source group 20, a light is emitted toward the light incident surface 34A of the light guide plate 30. The light enters the light guide plate 30. The light that entered (incident light) propagates inside the light guide plate 30 while being reflected at the respective inner surfaces of the light guide plate 30, and exits from the first main surface 32A of the light guide plate 30. Light exited from the light guide plate 30 is emitted to the display element 40 afterwards. As a result, an image formed at the display element 40 is displayed externally, and a viewer of the display device 10 can recognize the image formed at the display element 40. Note that, as described above, in the case of the illuminating device, the display element 40 can be omitted.

As described above, as the light guide plate 30 of the display device 10, instead of an acrylic plate, a glass plate is desired to be applied.

However, when a typical glass plate used for a building, a display device, or the like is applied as the light guide plate 30, during propagation of the incident light inside the light guide plate 30, a considerable amount of light is absorbed or scattered, and thereby there is concern that light with sufficient intensity is not likely to exit from the first main surface 32A. Moreover, there is concern that during propagation of the incident light, when a portion of a specific wavelength is selectively absorbed, light with different color from the color of the incident light exits. This is because for the above-described typical glass, although reducing a loss due to light absorption or scattering (in the following also referred to as light absorption) in the normal direction mainly to the glass main surface (in the following also referred to as a main surface direction) has been taken into consideration, reducing a light absorption in a direction orthogonal to the normal direction to the main surface (in the following also referred to as a normal direction to end surface) has not been taken into consideration.

The above-described concerns have already been a problem for various displays including liquid crystal television of a size of about 20 inches or more or the like, a digital signage, lighting, or the like. Therefore, the conventional typical glass plate has not been suitable for applying to a light guide plate. In addition, recently, display devices with greater sizes have become mainstream; and, even with an existing high transparency glass such as being used for a cover glass for a photovoltaic cell or the like, according to the above-described concern, the conventional typical glass plate becomes unsuitable for use as a light guide plate. With further increasing the size of the display device 10 along with the light guide plate, the above-described concern can become more conspicuous hereafter.

It becomes evident that in order to solve the above-described problems, especially that the light absorption in the normal direction to the end surface cannot be uniquely reduced only by reducing the light absorption in the main surface direction, then it is necessary not only to simply reduce the light absorption in the main surface direction but also to actively reduce the light absorption in the normal direction to the end surface.

The reason is as follows. When an inside of a glass is in an ideal state of optical uniformity, an absorbance of the glass follows a Lambert-Beer law, and is uniquely determined by an absorbance per unit length. In this case, the average absorbance coefficient $\alpha_{ave1}$ in the main surface direction of the glass plate and the average absorbance coefficient $\alpha_{ave2}$ in the normal direction of the end surface are the same. However, inside the actual glass, factors of optical non-uniformity are present such as fine bubbles, a refractive-index distribution on an order of µm, a colored layer, a refractive-index heterogeneous layer, such that complete optical isotropy is not present. Especially, for the typical glass plate, because only the optical homogeneity in the main surface direction is considered to be important, there is concern that the optical homogeneity in the normal direction of the end surface becomes poorer.

For the conventional glass plate, only an appearance or an optical characteristic in the main surface direction is emphasized, and further, an optical path length is not more than about a thickness of the glass plate. In such a case, the above-described problem is not likely to become evident. However, in the usage, such as the subject in the present invention, in which the light absorption in the normal direction of the end surface is important, the optical path length becomes longer, 200 mm or greater, and poor quality of the optical homogeneity in the normal direction of the end surface affects significantly the performance. Such an optical characteristic of a glass plate in a normal direction of an end surface has not been taken into account even for a cover glass for a photovoltaic cell which requires high transparency, for example.

However, according to an embodiment of the present invention, a glass plate with a length of a side L of 200 mm or more and a thickness θ of 1.0 mm or more, having first and second main surfaces; and one end surface or a plurality of end surfaces connecting the main surfaces to each other, including 1 weight ppm to 80 weight ppm of iron in a total amount in terms of $Fe_2O_3$, with 0.1 weight ppm to 10.0 weight ppm of $Fe^{2+}$ in terms of $Fe_2O_3$, and 0.1 weight ppm to 10.0 weight ppm of Ni, Mn, Cr, Co and V in total, in a sample "A", obtained by cutting the glass plate from a central portion of the glass plate in a direction orthogonal to the first main surface, with a size having a longitudinal length of 50 mm, a transverse length of 50 mm and a thickness of θ, the two main surfaces and first and second cut surfaces that face each other being set to have an arithmetic average roughness Ra of 0.1 μm or less, an average absorbance coefficient, $\alpha_{ave1}$, for a wavelength within a range of 400 nm to 700 nm measured on the first main surface in a normal direction being 0.009 or less, and a ratio of an average absorbance coefficient, $\alpha_{ave2}$, for a wavelength within a range of 400 nm to 700 nm measured on the first cut surface in a direction orthogonal to the normal direction, to the absorbance coefficient $\alpha_{ave1}$, $\alpha_{ave2}/\alpha_{ave1}$, is 1.3 or less, is provided.

A main factor of light absorption of the glass plate is iron ions included as impurities. Iron is included inevitably in a glass as a raw material of a glass manufactured industrially, and an incorporation of iron into a glass is inevitable.

A contained amount of a total iron oxide (t-$Fe_2O_3$) in terms of $Fe_2O_3$ is set to 80 weight ppm or less in order to realize a quite high transmittance over an entire visible range. The contained amount of t-$Fe_2O_3$ is more preferably 60 weight ppm or less, especially preferably 45 weight ppm or less, and the most preferably 35 weight ppm or less.

However, a total amount of iron oxide in the glass according to the present invention is set to 1 weight ppm or more. When the total amount of iron oxide is less than 1 weight ppm, it becomes difficult to enhance a meltability of a glass upon manufacturing a multicomponent oxide glass, or it becomes difficult to produce in large volume at low cost. Moreover, it becomes difficult to obtain a raw material. The total amount of iron oxide is preferably 5 weight ppm or more, more preferably 8 weight ppm, and further preferably 10 weight ppm or more. Note that the total amount of iron oxide in the glass can be controlled by an amount of iron component added during manufacturing of the glass.

In the present invention, the total amount of iron oxide in the glass for a glass material is expressed by an amount of $Fe_2O_3$. However, the iron ions existing in the glass do not always exist as $Fe^{3+}$ (trivalent iron).

Typically, in a glass, $Fe^{3+}$ and $Fe^{2+}$ (divalent iron) exist simultaneously (in the following referred to as "iron component" as a whole). The iron component has an absorption in the visible range. Because the absorbance coefficient of $Fe^{2+}$ (11 $cm^{-2}$ $Mol^{-1}$) is an order of magnitude greater than the absorbance coefficient of $Fe^{3+}$ (0.96 $cm^{-2}$ $Mol^{-1}$), $Fe^{2+}$ reduces more of the internal transmittance in the visible range. Therefore, the contained amount of $Fe^{2+}$ is preferably small for increasing the internal transmittance in the visible range.

In the glass according to the present invention, the contained amount of divalent iron ($Fe^{2+}$) in terms of $Fe_2O_3$ in weight ppm is controlled to 10 weight ppm or less. Preferably, the contained amount is 8.0 weight ppm or less, more preferably 6.0 weight ppm or less, especially preferably 4.0 weight ppm or less, and most preferably 3.5 weight ppm or less.

In this way, in the glass plate according to the embodiment, by controlling the amount of the iron component, light with a specific wavelength due to the iron component can be significantly prevented from being absorbed.

In addition, when the total amount of iron oxide included in the glass plate is controlled to 80 ppm or less and the contained amount of divalent iron ($Fe^{2+}$) in terms of $Fe_2O_3$ by weight ppm is controlled to 10 weight ppm or less, manufacturing the glass plate may become difficult. Especially, it becomes evident, according to a review by the inventors of the present invention, that it is more difficult to enhance the homogeneity inside a furnace upon melting as compared to a conventional glass.

That is, a molten glass, in which an iron component, especially $Fe^{2+}$, is excessively removed, has a characteristic that light, especially infrared light, is not readily absorbed. Therefore, in order to heat such a molten glass, a great amount of energy is required to be given. As a result, there is concern that the energy efficiency in the manufacturing process may decrease to an unrealistic level. Moreover, there is concern that in such a heating state, compositions in the upper part and the bottom part of the molten glass may vary, and the composition of the finally obtained glass plate may be non-uniform. Furthermore, there is concern that in an operation in such a high temperature state, manufacturing equipment may be broken or deteriorated. Inversely, when the heating state is controlled to the state corresponding to a typical glass, there is concern that a quality of product may be deteriorated, e.g. bubble defects may increase because the melting of glass is not advanced, or the homogeneity may decrease because a viscosity of the molten glass is low.

However, in the glass plate according to the embodiment, a total contained amount of metallic ions selected from a group including Ni, Mn, Cr, Co, and V is controlled to be 0.1 weight ppm or more in order to deal with the above-described problems.

The above-described metallic ions have characteristics of absorbing light within a range from the ultraviolet region to the near-infrared region. Therefore, when the molten glass includes the above-described transition metal ions, even if the iron component, especially $Fe^{2+}$ is excessively removed, heating becomes relatively easy, and the above-described problem can be relieved.

Moreover, the above-described transition metal ions also function as colored components of glass. Then, by adjusting the amount of the above-described transition metal ions, weak light absorptions are intentionally caused to occur in wavelength regions other than the light absorption by the iron component, and thereby the light absorption spectrum in the range of wavelengths of 400 nm to 700 nm can be more flattened. Therefore, compared with a glass plate that is obtained by simply reducing the iron component, even if the optical pass length becomes long, e.g. 200 mm, a color deviation between an incident light and an exit light can be controlled.

When a great amount of the above-described transition metal ions are included in the glass raw material, a transparency of the finally obtained glass plate may be degraded.

However, in the glass plate according to the embodiment, the total amount in the above-described transition metal ions is controlled to 10.0 weight ppm or less. Therefore, in the embodiment, a homogeneous glass plate can be manufactured with a realistic process without adversely affecting transparency. Among the above-described transition metal ions, the total amount of Ni, Cr, Co, and V that easily adversely affect transparency is preferably 7.0 weight ppm or less, more preferably 3.0 weight ppm or less, further preferably 2.0 weight ppm or less, especially preferably 1.5 weight ppm or less, and most preferably 1.0 weight ppm or less.

Moreover, the inventors of the present invention have clarified the magnitude of affecting transparency by Ni, Mn, Cr, Co, and V. The average absorbance coefficient in a range of wavelengths from 400 nm to 700 nm per 1 ppm of Ni is 0.0026. The average absorbance coefficient in a range of wavelengths from 400 nm to 700 nm per 1 ppm of Mn is 0.00005. The average absorbance coefficient in a range of wavelengths from 400 nm to 700 nm per 1 ppm of Cr is 0.0013. The average absorbance coefficient in a range of wavelengths from 400 nm to 700 nm per 1 ppm of Co is 0.0085. The average absorbance coefficient in a range of wavelengths from 400 nm to 700 nm per 1 ppm of V is 0.00007. Based on the above-described knowledge, the inventors of the present invention found that the following formula (A) is preferably satisfied in order to obtain the desired high transparency glass:

$$26\times[Ni]+0.5\times[Mn]+13\times[Cr]+85\times[Co]+0.7\times[V]<70. \quad \text{formula (A)}$$

Moreover, the following formula (B) is further preferably satisfied:

$$26\times[Ni]+0.5\times[Mn]+13\times[Cr]+85\times[Co]+0.7\times[V]<18. \quad \text{formula (B)}$$

In the above formulas, [Ni], [Mn], [Cr], [Co], and [V] are contained amounts (weight ppm) of Ni, Mn, Cr, Co, and V, respectively.

According to the above-described features, the glass plate according to the embodiment has a high transparency because influences from the respective colored components are suppressed to the minimum, and the problem that light of specific wavelength is absorbed selectively can be solved significantly. Therefore, the glass plate according to the embodiment can also be applied as an edge light type light guide plate for a relatively large screen, for which application had been difficult.

Moreover, the glass plate according to the embodiment has a feature that in a sample "A", obtained by cutting the glass plate from a central portion of the glass plate in a direction orthogonal to the first main surface, with a size having a longitudinal length of 50 mm, a transverse length of 50 mm and a thickness of θ, the two main surfaces and first and second cut surfaces that face each other being set to have an arithmetic average roughness Ra of 0.1 µm or less, an average absorbance coefficient, $\alpha_{ave1}$, for a wavelength within a range of 400 nm to 700 nm measured on the first main surface in a normal direction is 0.009 or less, and a ratio of an average absorbance coefficient, $\alpha_{ave2}$, for a wavelength within a range of 400 nm to 700 nm measured on the first cut surface in a direction orthogonal to the normal direction, to the absorbance coefficient $\alpha_{ave1}$, $\alpha_{ave2}/\alpha_{ave1}$, is 1.3 or less.

Especially, $\alpha_{ave1}$ is preferably 0.007 or less, more preferably 0.006 or less, further preferably 0.005 or less, and especially preferably 0.0045 or less. Moreover, the ratio $\alpha_{ave2}/\alpha_{ave1}$ is preferably 1.25 or less, more preferably 1.2 or less, further preferably 1.15 or less, and most preferably 1.1 or less.

The feature that the ratio of $\alpha_{ave2}$ to $\alpha_{ave1}$ is 1.3 or less means that a difference between optical homogeneity in the normal direction to the main surface of the glass plate and optical homogeneity in the normal direction of the end surface, which is orthogonal to the normal direction to the main surface, is small.

The inventors found experimentally that the optical homogeneity in the normal direction to the end surface is realized by obtaining a homogeneous molten glass in a furnace upon melting glass, especially, compared with the optical homogeneity as viewed from the normal direction to the main surface of the glass plate, the effect of homogeneity in the depth direction in the furnace upon melting is greater. However, as described above, different from a typical glass or a conventional high transparent glass, when the iron component, especially, $Fe^{2+}$ is excessively removed, in the typical melting method, it is difficult to enhance the homogeneity in the depth direction in the furnace.

However, as a result of an earnest investigation the inventors found that even in the glass in which the iron component, especially $Fe^{2+}$ is excessively removed, homogeneity in the depth direction in the furnace can be maintained, by combining a part of or all of the following: optimization of a percentage of glass cullet included in a glass raw material and an amount of fining agent; controlling an agitation rate by a stirrer in a glass dissolver; controlling temperature in the depth direction by a burner heating in an upper space of the molten glass and a current-carrying heating to the molten glass; controlling a temperature gradient from the highest temperature region to the clarification temperature region in the dissolver; and the like, and in addition to the above-described method, by controlling an amount of β-OH included in the glass according to the amount of $Fe^{2+}$ included in the glass. In the glass plate according to the embodiment, the optical homogeneity in the normal direction of the end surface is prevented from degrading by the above-described methods and $\alpha_{ave2}/\alpha_{ave1}$ is controlled to be 1.3 or less.

The mechanism whereby an amount of β-OH in a glass affects homogeneity in a depth direction in a furnace in the case where an iron component, especially $Fe^{2+}$, is excessively removed has not been completely clarified. However, the mechanism can be described by the following hypothesis. Note that the amount of β-OH discussed here is a value defined spectroscopically using a method which will be described later. An effect that enhancing an amount of β-OH in a glass facilitates a burn-through of a glass raw material batch such that the glass easily melts homogeneously has been known. In addition, there is an effect that by increasing the amount of β-OH, it becomes possible to increase a diameter of a bubble in a glass melt occurring during the melting, and thereby clarity is improved. Furthermore, the inventors found experimentally that in the case where a total amount of iron oxide is extremely small, 80 ppm or less, such as the glass according to the embodiment, and the amount of $Fe^{2+}$ in terms of $Fe_2O_3$ is unconventionally quite small, 4.0 ppm or less, that by increasing β-OH in the glass and increasing an absorption to be within a range from the near infrared region to the infrared region of the glass melt, an effect of accelerating heating of the glass melt and enhancing the homogeneity is present. This effect is also influenced by the presence of light absorption resulting from β-OH in the wavelength region affected by light absorption resulting from $Fe^{2+}$. When the amount of $Fe^{2+}$ is controlled to be small, the light absorption by $Fe^{2+}$ becomes small, and the value of β-OH defined spectroscopically also decreases. This is because even in such a state, in order to obtain a sufficient light absorption and accelerate heating, the amount of β-OH is required to be increased.

The amount of β-OH in the glass plate according to the embodiment is preferably 0.015×[$Fe^{2+}$] or more, more preferably 0.025×[$Fe^{2+}$], and most preferably 0.03×[$Fe^{2+}$], where [$Fe^{2+}$] is an amount of $Fe^{2+}$ in terms of $Fe_2O_3$ (weight ppm).

When the above-described glass plate is used for the light guide plate 30, even if an optical path length of light that enters from the incident end surface 34A, propagates inside the light guide plate 30 and exits from the light outgoing main surface 32A becomes relatively longer, the light inside the light guide plate 30 can be prevented from attenuating significantly.

According to the above-described features, when the glass plate according to the embodiment is applied as the light guide plate 30 in the display device 10, even if the light guide plate 30 has a great size, such as a length L of 20 cm or more and a thickness θ of 1.0 mm or more, upon causing light to enter the incident end surface 34A of the light guide plate 30 and to exit from the light outgoing main surface 32A, it becomes possible to cause outgoing light with relatively small attenuation to exit. Moreover, it becomes possible to control a selective absorption of a specific wavelength in the light guide plate 30, and a color deviation between the incident light and the outgoing light can be significantly reduced.

(Evaluation Method for Average Absorbance Coefficients $\alpha_{ave1}$ and $\alpha_{ave2}$)

In the following, an evaluation method for the average absorbance coefficients $\alpha_{ave1}$ and $\alpha_{ave2}$ will be described in detail.

The average absorbance coefficients $\alpha_{ave1}$ and $\alpha_{ave2}$ of a glass plate are evaluated by the following method.

First, the glass plate is cut in a direction orthogonal to the first main surface, and a sample with a size having a longitudinal length of 50 mm, a transverse length of 50 mm, and a thickness of θ mm is obtained from an approximately central portion of the glass plate. When the main surfaces and cut surfaces are not smooth, the first main surface and the second main surface of the sample and the first cut surface and the second cut surface that face each other are polished until an arithmetic average roughness Ra of each surface becomes 0.1 μm or less, to prepare a sample "A".

Next, for any of the main surfaces of the sample "A" (first main surface), in a normal direction to the main surface, within a range of wavelength of 400 nm to 700 nm, a reflectance $R_1$ and a transmittance $T_1$ are measured at 1 nm intervals. Note that the reflectance $R_1$ is a value obtained taking into account multiple-reflections at both main surfaces of the sample "A".

Next, from the obtained reflectance $R_1$ and the transmittance $T_1$, by using the following formula (1), the absorbance coefficients $\alpha_1$ of the sample "A" are obtained at 1 nm intervals, and by averaging the same, the average absorbance coefficient $\alpha_{ave1}$ is obtained:

$$\alpha_1 = -\log_e\{[T_1^2-(1-R_1)^2+((T_1^2-(1-R_1)^2)^2+4T_1^2)^{0.5}]/2T_1\}/(0.1\theta). \quad \text{Formula (1)}$$

The average absorbance coefficient $a_{ave2}$ of the sample "A" is evaluated by the following method.

For any one end surface of the polished cut surfaces of the sample "A" (first end surface), in a normal direction to the end surface, within a range of wavelength of 400 nm to 700 nm, a transmittance $T_2$ are measured at 1 nm intervals.

Next, from the obtained transmittance $T_2$, by using the following formula (2), the absorbance coefficients $\alpha_2$ are obtained at 1 nm intervals, and by averaging the same, the average absorbance coefficient $\alpha_{ave2}$ is obtained:

$$\alpha_2 = \log_e\{[-(1-R_2)^2+((1-R_2)^4+4R_2^2 \cdot T_2^2)^{0.5}]/2R_2^2 \cdot T_2\}/5. \quad \text{Formula (2)}$$

Because $R_2$ is a reflectance on one surface of the sample "A", $R_2$ is obtained from the reflectance $R_1$ obtained taking into account multiple-reflections and the transmittance $T_1$ corresponding to the optical path length thereof:

$$R_2 = R_1/\{1+T_1 \times \exp(-\alpha_1 \times 0.1\theta)\}. \quad \text{Formula (3)}$$

An average absorbance coefficient $\alpha_{ave1}$ and an average absorbance coefficient $\alpha_{ave2}$ of the glass plate are assumed to be the same as the average absorbance coefficient $\alpha_{ave1}$ and the average absorbance coefficient $\alpha_{ave2}$ obtained for the sample "A", respectively.

According to the above-described method, the average absorbance coefficient $\alpha_{ave1}$ and the average absorbance coefficient $\alpha_{ave2}$ of the glass plate can be evaluated.

Other Features of Glass Plate According to the Embodiment

The glass plate according to the embodiment has a feature of excellent rectilinearity of light because of high transparency and high homogeneity, particularly high transparency and high homogeneity in the normal direction to the end surface. High transparency and high homogeneity in the normal direction to the end surface mean that an occurrence of microscopic bubbles on the order of μm or unevenness of refraction index are controlled, and rectilinearity of light is excellent.

In the following, the above-described features will be described quantitatively.

(Distribution of Refraction Index)

The glass plate according to the embodiment has a feature that a standard deviation σ of a distribution of refraction index Δn in a cross-section in a direction orthogonal to the two main surfaces is less than or equal to $5 \times 10^{-5}$.

A standard deviation σ of a distribution of refraction index Δn of a glass plate is evaluated as follows.

First, the glass plate is cut in a direction orthogonal to the main surfaces, and a sample having a longitudinal length of 50 mm and a transverse length of 3 mm is extracted from an approximately central portion of the glass plate. When the main surface and cut surface of the obtained sample are not smooth, each of both main surfaces of the sample and the two cut surfaces with a length of a side of 50 mm of the sample are polished until an arithmetic average roughness Ra of each surface becomes 0.1 μm or less, to prepare a sample "B".

Next, on one of the two polished cut surfaces of the sample "B", by using a transmission type two-beam interference microscope, a refraction index distribution Δn (a map of refraction index within a measurement region) is measured. From the obtained refraction index distribution Δn, a standard deviation σ is calculated.

The standard deviation σ of the above-described refraction index distribution Δn can be used as an index indicating homogeneity in a cut surface cut in a direction orthogonal to two main surfaces of a glass plate. That is, it can be said that the smaller the standard deviation σ of the refraction index distribution Δn is, the fewer foreign matters are present, the smaller a composition variation region is, and the higher the homogeneity of the glass plate is.

The standard deviation σ of the refraction index distribution Δn is preferably $4.0 \times 10^{-5}$ or less, more preferably $3.0×10^{-5}$ or less, further preferably $2.5×10^{-5}$ or less, and particularly preferably $2.0×10^{-5}$ or less.

(Rectilinearity of Light)

Figure 2:
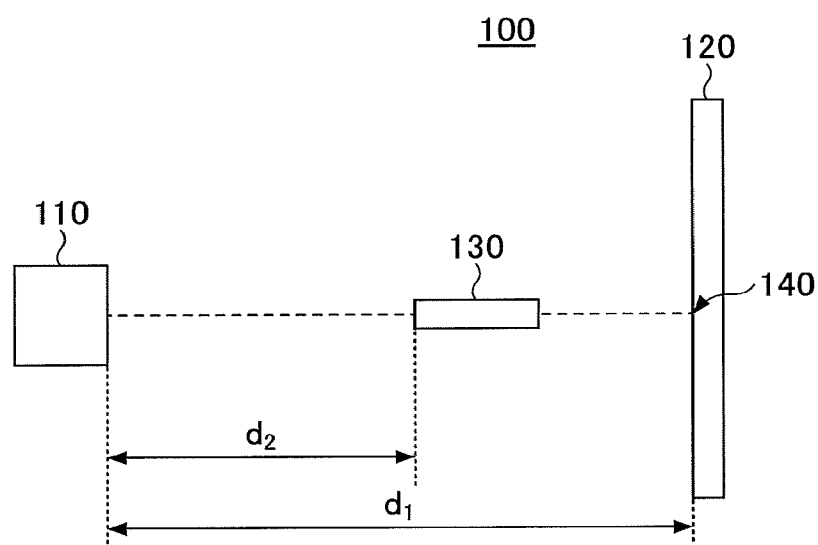
FIG. 2 is a diagram schematically depicting an example of a configuration of an apparatus used when evaluating a straightness property of light in a glass plate.

In the present application, rectilinearity of light in a glass plate can be evaluated by using an apparatus illustrated in FIG. 2.

FIG. 2 schematically illustrates a configuration of the apparatus used upon evaluating rectilinearity of light in a glass plate. As illustrated in FIG. 2, the apparatus 100 includes a laser light source 110 and a screen 120. A distance $d_1$ from the laser light source 110 to the screen 120 is 160 mm.

When rectilinearity of light in a glass plate is evaluated by using the apparatus 100, a sample for evaluation is prepared first.

The sample with a size having a longitudinal length of 50 mm and a transverse length of 3 mm is obtained from an approximately central portion of the glass plate by cutting in a direction orthogonal to a main surface. When the main surface and cut surface of the obtained sample are not smooth, each of both main surfaces of the sample and the two cut surfaces that face each other with a length of a side of 50 mm of the sample are polished until an arithmetic average roughness Ra of each surface becomes 0.1 μm or less, to prepare a sample 130. Note that the sample 130 may be the sample "A" that is used upon evaluating the above-described average absorbance coefficients $α_{ave1}$ and $α_{ave2}$.

Next, the screen 120 is irradiated with laser light from the laser light source 110 without arranging the sample 130 inside the apparatus 100, and an area $S_0$ of a spot 140 formed on the screen is measured.

Next, the sample 130 is arranged between the laser light source 110 and the screen 120, and the same measurement as above is performed. At this time, the sample 130 is arranged so that an approximately central portion of one polished cut surface (in the following, referred to as an "irradiation surface") is irradiated with laser light. A distance $d_2$ from the laser light source 110 to the sample 130 is 40 mm. An area of the spot 140 formed on the screen 120 will be denoted as $S_1$.

The laser light used here includes, for example, a commercially available red light laser pointer (wavelength of 635 nm or the like). In the case where a beam diameter of laser light is greater than the thickness of the sample 130, a slit may be properly arranged between the laser light source 110 and the sample 130, so as to make the beam diameter less than the thickness of the sample 130.

The area of the spot 140 is evaluated by processing a spot image captured by a digital camera using a brightness profile function of image processing software. The brightness profile function of image processing software includes, for example, a Plot profile function of ImageJ 1.48v. In the present application, an interval of full width at half maximum of peak intensity is defined as the area of the spot 140. In the case where a shape of the spot 140 is approximately a rectangle, the areas $S_0$ and $S_1$ can be calculated by products of lengths of respective longitudinal and transverse sides of the spot 140.

A ratio of $S_1$ to $S_0$ obtained as above, $S_1/S_0$ can be used as an index indicating the rectilinearity of light in the glass plate. That is, the smaller the ratio $S_1/S_0$ is (i.e. the closer to 1), the more excellent the rectilinearity of light that propagates in the glass plate along the direction orthogonal to the end surface of the glass plate is.

The glass plate according to the embodiment has a value of the ratio $S_1/S_0$ of 2.25 or less. The value of the ratio $S_1/S_0$ is preferably less than or equal to 2.0, and most preferably less than or equal to 1.5.

(Shape of Glass Plate)

A dimension of the glass plate according to the embodiment is not particularly limited as long as the glass plate is provided with the above-described features. The glass plate may have a great dimension, such as a length of a side L being 20 cm or more and a thickness θ being 1.0 mm or more.

The thickness of the glass plate is preferably great from the viewpoint of maintaining stiffness and enhancing an incidence efficiency of light from a light source, in the case of using an edge light type light guide plate having a great area with a length of a side of 50 cm or more. The thickness is preferably greater than or equal to 1.5 mm, more preferably greater than or equal to 1.8 mm, and further preferably greater than or equal to 2.0 mm. However, because when the thickness increases, a weight increases, the thickness is preferably less than or equal to 4.0 mm. The thickness is more preferably less than or equal to 3.5 mmm, further preferably less than or equal to 3.0 mm, and especially preferably less than or equal to 2.8 mm.

In the case of applying the glass plate according to the embodiment to an exterior material for construction, an interior material such as a glass curtain or a glass rib, furniture such as a table or a shelf board, fixture, or the like, a plate thickness may be properly selected with a thickness of 1.0 mm or more according to design. When the plate thickness is desired to be particularly thick, such as greater than or equal to 12 mm, a plurality of sheets of glass plates may be stuck to each other.

Moreover, a shape of the glass plate is not particularly limited. The glass plate may have a rectangular shape, a shape of disk, or the like.

In addition, it is necessary to take notice that four end surfaces are present in the rectangular shaped glass plate, whereas one end surface is present in the disk-shaped glass plate.

Moreover, the glass plate may not be a flat plate, and the glass plate may be a plate in which a main surface has a curvature.

(Composition of Glass Plate)

A composition of the glass plate according to the embodiment may be of great variety as long as the glass plate is provided with the above-described features. The glass composition includes three kinds of compositions described below (glasses having a glass composition "A", a glass composition "B", and a glass composition "C", respectively) as representative examples. The glass composition of the glass according to the present invention is not limited to the examples of the glass compositions described here.

For example a glass plate with the glass composition "A" may include in a composition displayed in mass % based on oxide, substantially, 60% to 80% of $SiO_2$, 0% to 7% of $Al_2O_3$, 0% to 10% of MgO, 0% to 20% of CaO, 0% to 15% of SrO, 0% to 15% of BaO, 3% to 20% of $Na_2O$, and 0% to 10% of $K_2O$.

Alternatively, a glass plate with the glass composition "B" may include in a composition displayed in mass % based on oxide, substantially, 45% to 80% of $SiO_2$, $Al_2O_3$ of greater than 7% and less than or equal to 30%, 0% to 15% of $B_2O_3$, 0% to 15% of MgO, 0% to 6% of CaO, 0% to 5% of SrO, 0% to 5% of BaO, 7% to 20% of $Na_2O$, 0% to 10% of $K_2O$, and 0% to 10% of $ZrO_2$.

Alternatively, a glass plate with the glass composition "C" may include in a composition displayed in mass % based on oxide, substantially, 45% to 70% of $SiO_2$, 10% to 30% of $Al_2O_3$, 0% to 15% of $B_2O_3$, 5% to 30% in total of at least one components selected from a group including MgO, CaO, SrO and BaO, and at least one component selected from a group including $Li_2O$, $Na_2O$, and $K_2O$ of greater than or equal to 0% and less than 3%.

Composition ranges of the respective components of the glass compositions of the glass plate according to the present invention having the above-described components will be described as follows. In the specification of the present application, the glass component will be indicated in terms of oxide such as $SiO_2$ or $Al_2O_3$, and contained amounts (glass compositions) of the respective components with respect to the entire glass will be indicated in mass % based on oxide, or weight ppm (weight percent may be denoted simply as %, or weight ppm may be denoted simply as ppm).

$SiO_2$ is a main component of a glass.

Contained amount of $SiO_2$ is, in order to maintain a weather resistance or a devitrification characteristic of the glass, in a composition displayed in mass % based on oxide, in the glass composition "A", preferably 60% or more, and more preferably 63% or more. In the glass composition "B", the contained amount is preferably 45% or more, and more preferably 50% or more. In the glass composition "C", the contained amount is preferably 45% or more, and more preferably 50% or more.

The contained amount of $SiO_2$ is, in order to facilitate dissolution and to maintain good quality of foams, or in order to control a contained amount of divalent iron ($Fe^{2+}$) in glass to be low and to make an optical characteristic excellent, in the glass composition "A", preferably 80% or less, and more preferably 75% or less. In the glass composition "B", the contained amount is preferably 80% or less, and more preferably 70% or less. In the glass composition "C", the contained amount is preferably 70% or less, and more preferably 65% or less.

$Al_2O_3$ is an indispensable component in the glass compositions "B" and "C" for improving the weather resistance of the glass. In order to maintain the weather resistance practically required in the glass according to the embodiment, the contained amount of $Al_2O_3$ is, in the glass composition "A", preferably 1% or more, and more preferably 2% or more. In the glass composition "B", the contained amount is preferably greater than 7%, and more preferably 10% or more. In the glass composition "C", the contained amount is preferably greater than 10%, and more preferably 13% or more.

The contained amount of $Al_2O_3$ is, in order to control a contained amount of divalent iron ($Fe^{2+}$) to be low, to make an optical characteristic excellent, and to keep a fining effect, in the glass composition "A", preferably 7% or less, and more preferably 5% or less. In the glass composition "B", the contained amount is preferably 30% or less, and more preferably 23% or less. In the glass composition "C", the contained amount is preferably 30% or less, and more preferably 20% or less.

$B_2O_3$ is a component that facilitates melting of a glass raw material and enhances a mechanical characteristic or a weather resistance. However, in order for disadvantages such as a generation of a ream due to volatilization or an erosion of a furnace wall not to occur with respect to a soda lime silicate-based glass such as the glass composition "A", a contained amount of $B_2O_3$ is preferably 5% or less, more preferably 2% or less, and particularly preferably 1% or less. Most preferably $B_2O_3$ is not contained substantially. In the specification of the present application, in the following, substantially not containing means not containing except for inevitable impurities. Moreover, in the glass compositions "B" and "C", the contained amount of $B_2O_3$ is preferably 15% or less, and more preferably 12% or less.

Alkali metal oxides, such as $Li_2O$, $Na_2O$, and $K_2O$, are useful components for facilitating melting the glass raw material and controlling a thermal expansion, viscosity, or the like.

A contained amount of $Na_2O$ is, in the glass composition "A", preferably 3% or more, and more preferably 8% or more. The contained amount of $Na_2O$ is, in the glass composition "B", preferably 7% or more, and more preferably 10% or more. In order to maintain clarity upon dissolution and keep a fining effect of a manufactured glass, the contained amount of $Na_2O$ is, in the glass compositions "A" and "B", preferably 20% or less, and more preferably 15% or less. In the glass composition "C", the contained amount is preferably 3% or less, and more preferably 1% or less.

Moreover, a contained amount of $K_2O$ is, in the glass compositions "A" and "B", preferably 10% or less, and more preferably 7% or less. In the glass composition "C", the contained amount is preferably 2% or less and more preferably 1% or less".

Moreover, $Li_2O$ is an optional component, facilitates vitrification, controls a contained amount of iron that is contained as an impurity derived from the raw material to be low, and controls a batch cost to be low. In the glass compositions "A", "B", and "C", it becomes possible to include $Li_2O$ of 2% or less.

Moreover, a total contained amount of the alkali metal oxides ($Li_2O+Na_2O+K_2O$) is, in order to maintain clarity upon dissolution and keep the quality of foams of a manufactured glass, in the glass compositions "A" and "B", preferably 5% to 20%, and more preferably 8% to 15%. In the glass composition "C", the contained amount is preferably 0% to 2%, and more preferably 0% to 1%.

Alkali-earth metal oxides such as MgO, CaO, SrO and BaO are useful components for facilitating melting a glass raw material and controlling a thermal expansion, viscosity, or the like.

MgO has an effect of reducing viscosity, upon dissolution of a glass, and facilitating the dissolution. Moreover, because MgO has an effect of reducing a specific gravity and making the glass plate difficult to be scratched, in the glass compositions "A", "B", and "C", MgO can be contained. Moreover, in order to reduce a thermal expansion coefficient and to make a devitrification characteristic excellent, a contained amount of MgO is, in the glass composition "A", preferably 10% or less, more preferably 8% or less, and further preferably 5% or less. In the glass composition "B", the contained amount is preferably 15% or less, more preferably 12% or less, and further preferably 10% or less. In the glass composition "C", the contained amount is preferably 10% or less, and more preferably 5% or less.

Because CaO is a component that facilitates melting a glass raw material, and controls viscosity, a thermal expansion or the like, in the glass compositions "A", "B", and "C", CaO can be contained. In order to obtain the above-described effect, in the glass composition "A", a contained amount of CaO is preferably 3% or more, and more preferably 5% or more. Moreover, in order to make a devitrification excellent, in the glass composition "A", the contained amount is preferably 20% or less, and more preferably 10% or less. In the glass composition "B", the contained amount is preferably 6% or less, and more preferably 4% or less.

SrO has an effect of suppressing an increase of a thermal expansion coefficient and reducing a high temperature viscosity of a glass. In order to obtain the above-described effects, in the glass compositions "A", "B", and "C", SrO can be contained. In order to control the thermal expansion coefficient of the glass to be low, in the glass compositions "A" and "C", a contained amount of SrO is preferably 15% or less, and more preferably 10% or less. In the glass composition "B", the contained amount is preferably 5% or less and more preferably 3% or less.

BaO also has an effect of suppressing an increase of a thermal expansion coefficient and reducing a high temperature viscosity of a glass, similarly to SrO. In order to obtain the above-described effects, BaO can be contained. In order to control the thermal expansion coefficient of the glass to be low, in the glass compositions "A" and "C", a contained amount of BaO is preferably 15% or less, and more preferably 10% or less. In the glass composition "B", the contained amount is preferably 5% or less and more preferably 3% or less.

Moreover, a total contained amount of the alkali-earth metal oxides (MgO+CaO+SrO+BaO) is, in order to control a thermal expansion coefficient to be low, to make a devitrification characteristic excellent, and to maintain a strength, in the glass composition "A", preferably 10% or more, and more preferably 13% or more. In the glass composition "B", the contained amount is preferably 1% or more, and more preferably 10% or more. In the glass composition "C", the contained amount is preferably 5% or more, and more preferably 10% or more. However, when the contained amount becomes too great, the amounts of other components become relatively smaller, and thereby a problem occurs in the devitrification characteristic and the strength. The contained amount is, in the glass composition "A", preferably 30% or less, and more preferably 27% or less. In the glass composition "B", the contained amount is preferably 15% or less, and more preferably 10% or less. In the glass composition "C", the contained amount is preferably 30% or less, and more preferably 20% or less.

In the glass composition of a glass of the glass plate according to the present invention, in order to enhance a thermal resistance of glass and a surface hardness, as an optional component, $ZrO_2$ of 10% or less, and preferably 5% or less, may be contained, in the glass compositions "A", "B", and "C". When the contained amount is greater than 10%, the glass is liable to devitrify, and it is not preferable.

Moreover, the glass of the glass plate according to the embodiment may contain $SO_3$ as a fining agent. In this case, a contained amount of $SO_3$ is, in a composition displayed in mass %, preferably greater than 0% and less than or equal to 0.5%. The contained amount is more preferably 0.4% or less, further preferably 0.3% or less, and most preferably 0.25% or less.

Moreover, the glass of the glass plate according to the present invention may include at least one of $Sb_2O_3$, $SnO_2$ and $As_2O_3$, as an oxidation agent and a fining agent. In this case, a contained amount of $Sb_2O_3$, $SnO_2$, or $As_2O_3$ is, in a composition displayed in mass %, preferably 0% to 0.5%. The contained amount is more preferably 0.2% or less, and further preferably 0.1% or less. Most preferably $Sb_2O_3$. $SnO_2$ or $As_2O_3$ is not substantially contained.

Because $Sb_2O_3$, $SnO_2$ and $As_2O_3$ function as oxidation agents for glass, for the purpose of controlling the amount of $Fe^{2+}$ in glass, $Sb_2O_3$, $SnO_2$ or $As_2O_3$ may be added within the above-described range. $As_2O_3$ may not be actively contained from an environmental standpoint.

The glass of the glass plate according to the present invention may include $TiO_2$. When $TiO_2$ is included, because $TiO_2$ also functions as a component for absorbing visible light, a contained amount of $TiO_2$ is preferably 1000 ppm or less with respect to a total amount in the above-described glass compositions. From a standpoint that $TiO_2$ does not reduce an internal transmittance of the glass plate for a light with a wavelength of 400 nm to 700 nm, the contained amount of $TiO_2$ is more preferably 500 ppm or less, and particularly preferably 100 ppm or less.

The glass of the glass plate according to the present invention may include $CeO_2$. $CeO_2$ has an effect of reducing oxidation-reduction of iron, and it is possible to reduce absorption by glass for light with a wavelength of 400 nm to 700 nm. Because when the glass includes a great amount of $CeO_2$, $CeO_2$ not only causes a solarization, but also functions as a component that absorbs visible light; thus, a contained amount of $CeO_2$ is preferably 1000 ppm or less with respect to a total amount in the above-described glass compositions. The contained amount of $CeO_2$ is more preferably 500 ppm or less, further preferably 400 ppm or less, particularly preferably 300 ppm or less, and most preferably 250 ppm or less. In the case of adding $CeO_2$, in order to facilitate controlling a variation in product characteristics upon manufacturing, particularly a variation in shade, preferably $CeO_2$ of 0.1 ppm or more is always added. For controlling shade, an addition of $CeO_2$ of 1.0 ppm or more is preferable, and an addition of $CeO_2$ of 5.0 ppm or more is more preferable. In the case of expecting the effect of reducing the oxidation-reduction of iron, an amount of addition of $CeO_2$ is preferably the same amount of iron included in the glass in terms of $Fe_2O_3$ (weight ppm) or more, more preferably 1.5 times the amount of iron or more, further preferably three times the amount of iron or more, and particularly preferably five times the amount of iron or more.

Moreover, the glass of the glass plate according to the present invention may include NiO. When the glass includes NiO, because NiO also functions as a colored component, a contained amount of NiO is preferably 10 ppm or less with respect to a total amount in the above-described glass compositions. Particularly, from a standpoint that NiO does not reduce the internal transmittance of the glass plate for light with a wavelength of 400 nm to 700 nm, the contained amount of NiO is preferably 1.0 ppm or less, more preferably 0.8 ppm or less, further preferably 0.6 ppm or less, and particularly preferably 0.5 ppm or less.

The glass of the glass plate according to the present invention may include $Cr_2O_3$. When the glass includes $Cr_2O_3$, because $Cr_2O_3$ also functions as a colored component, a contained amount of $Cr_2O_3$ is preferably 10 ppm or less with respect to a total amount in the above-described glass compositions. Particularly, from a standpoint that $Cr_2O_3$ does not reduce the internal transmittance of the glass plate for light with a wavelength of 400 nm to 700 nm, the contained amount of $Cr_2O_3$ is preferably 2.0 ppm or less, more preferably 1.6 ppm or less, further preferably 1.2 ppm or less, particularly preferably 1.0 ppm or less, further preferably 0.8 ppm or less, and most preferably 0.6 ppm or less.

The glass of the glass plate according to the present invention may include $MnO_2$. When the glass includes $MnO_2$, because $MnO_2$ also functions as a component for absorbing visible light, a contained amount of $MnO_2$ is preferably 50 ppm or less with respect to a total amount in the above-described glass compositions. Particularly, from a standpoint that $MnO_2$ does not reduce the internal transmittance of the glass plate for light with a wavelength of 400 nm to 700 nm, the contained amount of $MnO_2$ is preferably 30 ppm or less, more preferably 20 ppm or less, further preferably 15 ppm or less, and particularly preferably 10 ppm or less.

The glass of the glass plate according to the present invention may include at least one component selected from a group including Se, CoO, $V_2O_5$ and CuO. When the glass includes these components, because these components also function as components for absorbing visible light, contained amounts of the above-described components are respectively preferably 5.0 ppm or less, more preferably 2.0 ppm or less, and further preferably 1.0 ppm or less. Particularly, most preferably, these components are substantially not contained in the glass so as not to reduce the internal transmittance of the glass plate for light with a wavelength of 400 nm to 700 nm.

Manufacturing Method of Glass Plate According to the Embodiment

Next, an example of a manufacturing method of the glass plate according to the embodiment having the above-described features (in the following, referred to as a "first manufacturing method") will be briefly described.

Figure 3:
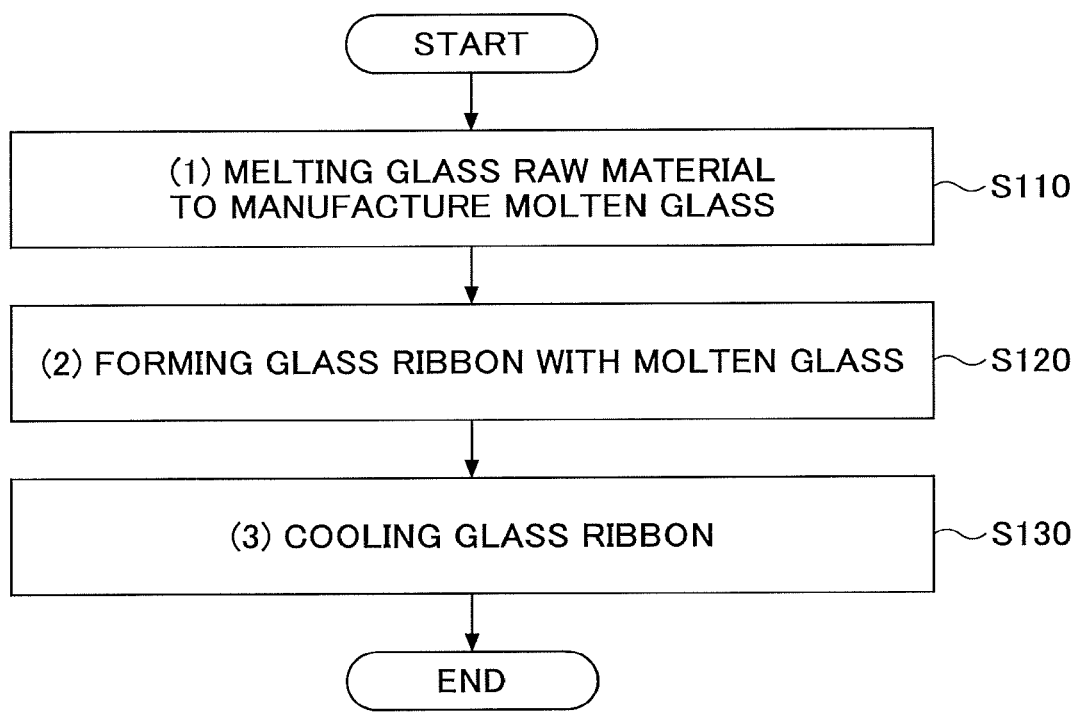
FIG. 3 is a flowchart roughly depicting an example of a flow of a manufacturing method of a glass plate according to an embodiment.

FIG. 3 is a flowchart schematically illustrating the first manufacturing method.

As illustrated in FIG. 3, the first manufacturing method includes (1) a step of dissolving a glass raw material to manufacture a molten glass (step S110);

(2) a step of forming a glass ribbon with the molten glass (step S120); and (3) a step of cooling the glass ribbon (step S130).

In the following, each step will be described (Step S110)

First, by mixing prescribed raw material components, a glass raw material is prepared. Moreover, the glass raw material is heated, and thereby a molten glass is manufactured.

The molten glass is prepared to make the content of an iron component (particularly $Fe^{2+}$), as an impurity, as small as possible. High purity glass raw material is used. Moreover, the mixing process and the melting process are performed in an environment of high cleanliness level.

However, a glass raw material from which iron is excessively removed has a characteristic that an infrared light is not likely to be absorbed upon dissolution. In order to obtain a molten glass from such a glass raw material with small iron component, it is necessary to give a great amount of energy to the glass raw material to heat the glass raw material. As a result, the energy efficiency in the manufacturing process decreases to an unrealistic level.

Moreover, in such a heating condition, the compositions may vary in an upper part and in a bottom part of the molten glass, and the composition of the finally obtained glass plate may become inhomogeneous. Furthermore, there is a concern that by the operation in such a high temperature the manufacturing equipment may be broken or deteriorated.

In the first manufacturing method, in order to solve the problem, a contained amount of transition metal ions configured with a group of Ni, Mn, Cr, Co and V, included in the glass raw material is controlled. That is, these transition metal ions are adjusted to be contained in the glass raw material so that the total contained amount is 0.1 weight ppm or more. These transition metal ions have characteristics of absorbing light in a range from the ultraviolet region to the near-infrared region. When the molten glass includes these transition metal ions, even if the iron component is excessively removed, heating becomes relatively easy, and the above-described problem is reduced.

These transition metal ions function as colored components in a glass. When a great amount of these transition metal ions is included in a glass raw material, a transparency of the finally obtained glass plate may be degraded.

In the first manufacturing method, a sum of these transition metal ions is controlled to be less than or equal to 10.0 weight ppm. According to the operation, it becomes possible to manufacture a homogeneous glass plate with a realistic process, without causing adverse effects on the transparency.

In addition, it becomes possible to maintain the homogeneity in the depth direction in a furnace, even for a glass in which an iron component, particularly $Fe^{2+}$, is excessively removed, by combining a part of or all of the following: an optimization of a proportion of glass cullet included in the glass raw material; a control of stirring rate by a stirrer in a glass dissolution bath; a temperature control in a depth direction by a burner heating in a space above the dissolved glass and an electro conductive heating to the dissolved glass; a temperature gradient control from the highest temperature region to a clarification temperature region; and the like, or in addition to the above-described methods, by controlling the β-OH amount included in the glass according to the amount of $Fe^{2+}$ included in the glass.

(Step S120)

Next, the molten glass obtained in the above-described process is formed into a glass ribbon. The method of formation includes a floating method, a roll out method, a fusion method, a mold cast method, and the like. For example, in the floating method, the molten glass flows into a floating bath, in which a molten tin is stored in advance, and floats on the molten tin. A glass ribbon is formed. A thickness of the molten glass becomes uniform while the molten glass moves on the molten tin.

The method of formation may be properly selected from generalized methods including the above-described methods, taking into account that a temperature region suitable for formation differs depending on the glass composition, an aimed thickness of the glass plate, a schedule of the manufacturing equipment, or the like.

(Step S130)

Afterwards, the glass ribbon is slowly cooled to a prescribed temperature. Glass plates are obtained by cutting the glass ribbon. A main surface of the glass plate may be as the glass plate is formed, or finished by polishing.

By the above-described processes, the glass plate according to the embodiment can be manufactured.

As described above, an example of the manufacturing method of the glass according to the embodiment has been described in detail. However, the manufacturing method of the glass plate according to the embodiment is not limited to the above description.

Moreover, in the above description, features of the glass plate according to the embodiment have been described, in the case where, as an example, the glass plate according to the embodiment is applied as an edge light type light guide plate.

However, the glass plate according to the present invention can be applied as various usages other than a light guide plate. Particularly, because in the glass plate according to the present invention, a contained amount of a contamination material is small and a transmittance is high, the glass plate according to the present invention can be effectively used for a purpose that requires high transmittance for visible light, such as a purpose of light sources of various electronic devices including light guide plates of the above-described various display devices or illuminating devices, or a purpose of exterior parts of substrate glasses for photovoltaic cells, cover glasses, or electronic devices. In addition, because the glass plate has not only the feature that a transmittance is greater than that of conventional glasses but also the feature of being excellent in a transparency viewed from a normal direction to an end surface and little distortion of images, the glass plate can be applied as exterior materials, interior materials, furniture or the like that require high designability.

PRACTICAL EXAMPLES

In the following, practical examples of the present invention will be described. In the following description, Examples 1 to 8 are practical examples, and Examples 9 to 11 are comparative examples.

Example 1

A glass plate was manufactured using the above-described method as illustrated in FIG. 3. For the formation method, a floating method was employed. The glass matrix composition was within the range of the above-described glass composition "A". Because an iron component and various transition metal ions included in a raw material were quite small amounts, input amounts were properly adjusted so as to be homogeneously blended in a raw material mixing process. Moreover, particularly, because of the high cost of transition metal ion raw materials a configuration of raw materials was optimized so that components included as impurities from other raw materials could also be used in order to reduce costs. In the dissolution process, in order to homogenize the glass melt, the temperature gradient of the glass melt in the furnace was performed using a stirrer with a controlled stirring rate and using an auxiliary heating in addition to the burner heating used for normal burning. Moreover, a humidity control of the raw material and a control of the proportion of glass cullet in a raw material batch were performed so that the β-OH fell within an appropriate range.

According to the above-described efforts, the glass raw material could be melted uniformly. After the manufacturing process of glass ribbon and the cooling process, a glass plate with a thickness of 2.5 mm (referred to as a "glass plate 1") was manufactured.

Examples 2 to 4

By using the same method as Example 1, glass plates were performed. The glass matrix composition was within the range of the above-described glass composition "A". In Examples 2 to 4, the composition of the raw material glass and the β-OH amount in the glass were different from those in Example 1. Other manufacturing conditions were the same as those in Example 1. According to the above-described efforts, the glass raw material could be melted uniformly. After the manufacturing process of glass ribbon and the cooling process, a glass plate with a thickness of 2.1 mm (glass plate 2), a glass plate with a thickness of 1.8 mm (glass plate 3) and a glass plate with a thickness of 3.8 mm (glass plate 4) were manufactured.

Examples 5 and 6

By using a roll out method for the formation method of glass plate, glass plates were manufactured. The glass matrix composition was within the range of the above-described glass composition "A". Taking into account differences of the heating state due to the difference of the structure of the furnace and the formation method and difference of viscosity at around a formation temperature, the glass matrix composition was made different from the case of Example 1. According to the above-described efforts, the glass raw material could be melted uniformly. After the manufacturing process of glass ribbon, the cooling process, and the polishing process, a glass plate with a thickness of 2.5 mm (glass plate 5) and a glass plate with a thickness of 4.0 mm (glass plate 6) were manufactured.

Examples 7 and 8

By using a mold cast method for the formation method of glass plate, glass plates were manufactured. The glass matrix composition of Example 7 was within the range of the above-described glass composition "B", and the glass matrix composition of Example 8 was within the range of the above-described glass composition "C". Because an iron component and various transition metal ions included in a raw material were in quite small amounts, raw material silica sand, into which the iron components and the transition metal irons had been homogeneously mixed in advance, was used so as to be homogeneously blended in the raw material mixing process. Furthermore, by using a stirrer with a controlled stirring rate and by controlling a dissolution time, a dissolution temperature profile and an atmosphere, a homogeneous glass melt was obtained. The glass melt was casted into a preheated mold having a dimension of 200 mm×600 mm. After the cooling process, and a working process including cutting, polishing and the like, a glass plate with a thickness of 1.0 mm (glass plate 7) and a glass plate with a thickness of 1.8 mm (glass plate 8) were manufactured.

Example 9

A glass plate was manufactured using the above-described method as illustrated in FIG. 3. For the formation method, a floating method was employed. The glass matrix composition was within the range of the above-described glass composition "A", and the same as the glass plate 1. In Example 9, Ni, Mn, Cr, Co, and V were not added, and the glass plate was manufactured under a condition so that β-OH becomes lower, and a glass plate with a thickness of 2.5 mm (glass plate 9) was obtained.

Example 10

A glass plate was manufactured using the above-described method as illustrated in FIG. 3. For the formation method, a floating method was employed. The glass matrix composition was within the range of the above-described glass composition "A", and the glass was a high transmittance soda lime silicate glass used as a substrate glass for photovoltaic cell. Upon glass dissolution, the manufacturing was performed under a manufacturing condition so as to obtain sufficient homogeneity viewed from the normal direction to the glass plate main surface, and a glass plate with a thickness of 1.8 mm (glass plate 10) was obtained.

Example 11

A glass plate was manufactured using a rollout method for the formation method of glass plate. The glass matrix composition was within the range of the above-described glass composition "A", and the glass was a high transmittance soda lime silicate glass used as a cover glass for photovoltaic cell. Upon glass dissolution, the manufacturing was performed under a manufacturing condition so as to obtain sufficient homogeneity viewed from the normal direction to the glass plate main surface. The obtained glass plate was polished, and a glass plate with a thickness of 2.5 mm (glass plate 11) was obtained.

Table 1, in the following, shows the compositions, the formation method, usage condition of stirrer upon dissolution, presence or absence of auxiliary heating of the glass plates 1 to 11 as a whole. A total amount of iron oxide (weight ppm) was measured by a fluorescent X-ray analysis, and a contained amount of $Fe^{2+}$ was measured according to ASTM C169-92. Note that the measured contained amount of $Fe^{2+}$ was indicated in terms of $Fe_2O_3$.

When the contained amount of $Fe^{2+}$ in the glass was less than 4.0 weight ppm, the amount of $Fe^{2+}$ was obtained by the following method. First, a contained amount of $Fe^{2+}$ (weight ppm), $C_{Fe2+}$, was measured by a method according to ASTMC 169-92, for a glass that was prepared such that the contained amount of $Fe^{2+}$ was greater than 4.0 weight ppm by properly adjusting the total amount of iron for the same glass matrix composition. A spectral transmittance of the glass within a range of wavelength of 1000 nm to 1250 nm was measured. Because a local minimum value % $T_{MIN}$ of the transmittance in the range is proportional to the contained amount of $Fe^{2+}$ in the glass, by using a calibration curve $Y=(C_{Fe2+}/\% T_{MIN}) X$, the contained amount of $Fe^{2+}$ in the glass was calculated. A local minimum value of the spectral transmittance within a range of wavelength of 1000 nm to 1200 nm where the contained amount of $Fe^{2+}$ is less than 4.0 weight ppm is denoted by "X", and the contained amount of $Fe^{2+}$ included in the glass is denoted by "Y".

Moreover, total amounts of cerium oxide, Ni, Cr, Mn, Co and V included in the glass, in terms of $CeO_2$, were obtained by using an ICP emission spectrometry, respectively.

The index of concentration of water included in a glass, β-OH ($mm^{-1}$), was calculated from an infrared transmission spectrum of the glass measured by using an FT-IR, using the following formula:

$$\beta\text{-OH } (mm^{-1}) = \text{Log}_{10}(T_{3500 \, cm-1}/T_{4000 \, cm-1})/\theta$$

where $T_{3500 \, cm-1}$ and $T_{4000 \, cm-1}$ are transmittances (%) at wavenumber of 3500 $cm^{-1}$ and wavenumber of 4000 $cm^{-1}$, respectively, and θ is a thickness (mm) of the glass plate.

TABLE 1

| | | glass plate | | | | | | | | | | |
|---|---|---|---|---|---|---|---|---|---|---|---|---|
| | no. | 1 | 2 | 3 | 4 | 5 | 6 | 7 | 8 | 9 | 10 | 11 |
| composition | $SiO_2$ (wt %) | 69.7 | 69.7 | 69.7 | 68.5 | 72.8 | 72.8 | 60.9 | 59.9 | 69.7 | 71.6 | 72.8 |
| | $Al_2O_3$ (wt %) | 3.0 | 3.0 | 3.0 | 5.0 | 1.0 | 1.0 | 12.8 | 17.3 | 3.0 | 1.9 | 1.0 |
| | $Na_2O$ (wt %) | 11.0 | 11.0 | 11.0 | 14.6 | 14.0 | 14.0 | 12.2 | 0.0 | 11.0 | 13.4 | 14.0 |
| | $K_2O$ (wt %) | 0.0 | 0.0 | 0.0 | 0.2 | 0.0 | 0.0 | 5.9 | 0.0 | 0.0 | 0.3 | 0.0 |
| | CaO (wt %) | 8.0 | 8.0 | 8.0 | 4.1 | 8.2 | 8.2 | 0.1 | 3.2 | 8.0 | 7.8 | 8.2 |
| | MgO (wt %) | 0.0 | 0.0 | 0.0 | 7.2 | 3.4 | 3.4 | 6.7 | 4.0 | 0.0 | 4.7 | 3.4 |
| | SrO (wt %) | 4.0 | 4.0 | 4.0 | 0.0 | 0.0 | 0.0 | 0.2 | 7.6 | 4.0 | 0.0 | 0.0 |
| | BaO (wt %) | 4.0 | 4.0 | 4.0 | 0.0 | 0.0 | 0.0 | 0.2 | 0.0 | 4.0 | 0.0 | 0.0 |
| | $ZrO_2$ (wt %) | 0.0 | 0.0 | 0.0 | 0.0 | 0.0 | 0.0 | 1.0 | 0.0 | 0.0 | 0.0 | 0.0 |
| | $B_2O_3$ (wt %) | 0.0 | 0.0 | 0.0 | 0.0 | 0.0 | 0.0 | 0.0 | 8.0 | 0.0 | 0.0 | 0.0 |
| | total $Fe_2O_3$ (ppm) | 30 | 25 | 35 | 80 | 60 | 60 | 80 | 80 | 30 | 100 | 60 |
| | $Fe^{2+}$ (ppm) | 0.5 | 2.5 | 0.1 | 4 | 4 | 4 | 6 | 8 | 0.5 | 30 | 11 |
| | Ni (ppm) | 0.2 | 0.2 | 0.3 | 0.4 | 1 | 1 | 0.5 | 0.5 | 0 | 2.1 | 1 |
| | Mn (ppm) | 1.5 | 0.6 | 2.2 | 1 | 4.2 | 4.2 | 0.5 | 0.5 | 0 | 6 | 4.2 |
| | Cr (ppm) | 0.3 | 0.2 | 0.4 | 0.4 | 1.3 | 1.3 | 0.5 | 0.5 | 0 | 1.4 | 1.3 |
| | Co (ppm) | 0 | 0 | 0 | 0 | 0 | 0 | 0 | 0.1 | 0 | 0 | 0 |
| | V (ppm) | 0 | 0 | 0 | 0 | 0 | 0 | 0.1 | 0 | 0 | 0 | 0 |
| | Se (ppm) | 2500 | 2200 | 2300 | 4000 | 4000 | 4000 | 4000 | 0 | 2500 | 4000 | 4000 |
| | $SO_3$ (ppm) | 0 | 0 | 0 | 0 | 2000 | 2500 | 0 | 0 | 0 | 0 | 2000 |
| | $Sb_2O_3$ (ppm) | 250 | 150 | 450 | 0 | 0 | 0 | 0 | 0 | 250 | 0 | 0 |
| | $CeO_2$ (ppm) | 250 | 150 | 450 | 250 | 0 | 0 | 0 | 250 | 200 | 200 | 0 |
| | $TiO_2$ (ppm) | 0 | 0 | 0 | 100 | 0 | 0 | 800 | 800 | 0 | 0 | 0 |
| | β-OH ($mm^{-1}$) | 0.15 | 0.17 | 0.14 | 0.17 | 0.4 | 0.4 | 0.25 | 0.5 | 0.12 | 0.17 | 0.4 |
| | formation method | floating method | floating method | floating method | floating method | roll out method | roll out method | cast method | cast method | floating method | floating method | roll out method |
| | stirrer rotation | high speed | high speed | high speed | high speed | high speed | high speed | high speed | high speed | high speed | high speed | low speed |
| | use of auxiliary heating | yes | yes | yes | yes | no | no | no | no | yes | no | yes |

(Evaluation)

Using the above-described glass plates 1 to 11, the following evaluation was performed.

(Evaluation of Average Absorbance Coefficient)

By using the above-described method, average absorbance coefficients $\alpha_{ave1}$ and $\alpha_{ave2}$ at the respective glass plates were obtained.

That is, first, samples each having a longitudinal length of 50 mm and a transverse length of 50 mm were extracted from approximately central portions of the respective glass plates 1 to 11 (referred to as "Sample 1" to "Sample 11", respectively).

Next, cut surfaces of the respective samples were polished until arithmetic average roughness Ra became 0.1 mm or less. The cut surfaces were finally subjected to mirror finishing by using abrasive grain corresponding to #4000 to #8000. Note that because the main surfaces of the respective samples were relatively smooth from the stage of immediately after the extraction (the arithmetic average roughness Ra≤0.1 μm), the polishing process was not performed.

Next, using a spectrometer (U-4100 by Hitachi High-Technologies Corporation), on first main surfaces (surfaces that did not contact with a tin bath upon manufacturing) of the respective samples, transmittance $T_1$ and reflectance $R_1$ within a range of wavelength of 400 nm to 700 nm were measured. For the measurement of reflectance, an absolute reflectivity measurement unit was used. Reflectance was measured at wavelength intervals of 1 nm. The reflectance $R_1$ is a value obtained taking into account multiple-reflections at both main surfaces of the sample.

Using the obtained transmittance $T_1$ and the reflectance $R_1$, by the above-described formula (1), absorbance coefficients within a range of wavelength of 400 nm to 700 nm were obtained at intervals of 1 nm. Moreover, by averaging these values, the average absorbance coefficient $\alpha_{ave1}$ was obtained.

Upon evaluating the average absorbance coefficient $\alpha_{ave2}$ from one polished cut surface side of the sample, by using a long sample measurement unit of a spectrometer (UH-4150 by Hitachi High-Technologies Corporation), transmittance $T_2$ within a range of wavelength of 400 nm to 700 nm was measured.

Because reflectance $R_2$ is reflectance at one surface of the sample "A", the reflectance $R_2$ is a value obtained from the reflectance $R_1$ obtained by taking into account multiple-reflections and the reflectance $T_1$ corresponding to an optical path length thereof, by using the above-described formula (3).

Using the obtained transmittance $T_2$ and the reflectance $R_2$, by the above-described formula (2), absorbance coefficients within a range of wavelength of 400 nm to 700 nm were obtained at intervals of 1 nm. Moreover, by averaging the values, the average absorbance coefficient $\alpha_{ave2}$ was obtained.

Table 2, in the following, shows the average absorbance coefficients $\alpha_{ave1}$, ratios $\alpha_{ave2}/\alpha_{ave1}$ obtained for the respective samples 1 to 11 (glass plates 1 to 11) as a whole.

TABLE 2

| | results of evaluation | | | |
|---|---|---|---|---|
| glass plate | average absorbance coefficient $\alpha_{ave1}$ (-) | ratio $\alpha_{ave2}/\alpha_{ave1}$ (-) | standard deviation $\sigma$ of refraction index distribution $\Delta n$ | S1/S0 |
| 1 | 0.0031 | 1.00 | $1.2 \times 10^{-5}$ | 1.26 |
| 2 | 0.0030 | 1.20 | $1.3 \times 10^{-5}$ | 1.31 |
| 3 | 0.0032 | 1.00 | $1.2 \times 10^{-5}$ | 1.44 |
| 4 | 0.0041 | 1.05 | $1.3 \times 10^{-5}$ | 1.53 |
| 5 | 0.0040 | 1.10 | $1.4 \times 10^{-5}$ | 1.75 |
| 6 | 0.0040 | 1.24 | $3.1 \times 10^{-5}$ | 2.18 |
| 7 | 0.0060 | 1.28 | $3.0 \times 10^{-5}$ | 2.21 |
| 8 | 0.0080 | 1.30 | $4.2 \times 10^{-5}$ | 2.25 |
| 9 | 0.0030 | 1.40 | $3.3 \times 10^{-5}$ | 2.41 |
| 10 | 0.0140 | 1.16 | $1.3 \times 10^{-5}$ | 2.29 |
| 11 | 0.0093 | 1.40 | $5.1 \times 10^{-5}$ | 2.57 |

From the results, it was found that for Samples 1 to 9 the average absorbance coefficient $\alpha_{ave1}$ was less than or equal to 0.009, and sufficiently small. Moreover, it was found that the ratio $\alpha_{ave2}/\alpha_{ave1}$ was almost 1, and a difference between an absorbency index in the normal direction to the main surface and an absorbency index in the normal direction to the cut surface was sufficiently small.

For Samples 10 and 11, it was found that the average absorbance coefficient $\alpha_{ave1}$ was greater than 0.009, and an absorbency index was relatively great. Moreover, for Samples 9 and 11, the ratio $\alpha_{ave2}/\alpha_{ave1}$ was greatly a larger than 1.3, and the absorbency index in the normal direction to the cut surface was further greater than the absorbency index in the normal direction to the main surface. For Sample 10, because it was easy to be heated, $\alpha_{ave2}/\alpha_{ave1}$ was within 1.3 or less, and the difference between the absorbency index in the normal direction to the main surface and the absorbency index in the normal direction to the cut surface was controlled to be small. However, because $Fe^{2+}$ was great, the absorbency index $\alpha_{ave1}$ was great, and the transparency was poor.

(Evaluation of Refraction Index)

Using the above-described method, standard deviations $\sigma$ of the refraction index distributions $\Delta n$ for the respective glass plates were obtained.

That is, first, a sample having a longitudinal length of 50 mm and a transverse length of 3 mm was extracted from an approximately central portion of each of the glass plates 1 to 11 (referred to as "Sample 1A" to "Sample 11A", respectively).

Next, for each Sample, each of both cut surfaces with a length of a side of 50 mm was to be polished for an arithmetic average roughness Ra of 0.1 µm or less. The polished surfaces were to be finally subjected to mirror finishing by using abrasive grain corresponding to #4000 to #8000. Note that because the main surfaces of the respective samples were relatively smooth from the stage of immediately after the extraction (the arithmetic average roughness Ra≤0.1 µm), the polishing process was not performed.

Next, on one of the two polished cut surfaces of each sample, by using a transmission type two-beam interference microscope (by Mizojiri Optical Co., Ltd.), a refraction index distribution $\Delta n$ (a map of refraction index within a measurement region) was measured.

From the obtained refraction index distribution $\Delta n$, a standard deviation $\sigma$ was calculated.

The above-described Table 2 shows the standard deviations $\sigma$ of the refraction index distributions $\Delta n$ obtained for Sample 1A (glass plate 1) to Sample 11A (glass plate 11) as a whole.

From the results, it was found that for the glass plates 1 to 8, the standard deviation $\sigma$ of the refraction index distribution $\Delta n$ was $5.0 \times 10^{-5}$ or less, and a variation in refraction index was small. It can be said that for the glass plates 1 to 8 homogeneity is great. Particularly, for the glass plates 1 to 5, the standard deviation $\sigma$ is $2.0 \times 10^{-5}$ or less, and it can be said that homogeneity is particularly excellent.

For the glass plate 11, it was found that the standard deviation $\sigma$ of the refraction index distribution $\Delta n$ was greater than 5.0×10−5, and a variation in refraction index was great. According to the above-described result, it can be said that for glass plate 11 homogeneity of glass is poor.

(Evaluation of Rectilinearity Characteristic of Light)

Using the above-described method, rectilinearity characteristic of light for each glass plate was evaluated.

For a sample, Samples 1 to 11 having polished cut surfaces used in the above-described (evaluation of average absorbance coefficient) were used.

First, a white screen, on which grids at intervals of 1 mm were printed in order to facilitate a size measurement, were arranged vertically at a position of 160 mm from a laser light source. For the laser light source, a semiconductor laser light source of a wavelength of 635 nm was used.

In the above-described state, the white screen was irradiated with a laser light from the laser light source. An area $S_0$ of a spot formed on the white screen (referred to as a "reference spot") was calculated.

Next, any of Samples 1 to 11 was arranged between the laser light source and the white screen, and the same measurement was performed. The sample was arranged so that an approximately central portion of one cut surface (irradiation surface) of the sample was irradiated with a laser light. A distance from the laser light source to the irradiation surface of the sample was 40 mm. An area $S_1$ of a spot formed on the white screen (referred to as an "evaluation spot") was measured.

From the above-described measurement, for each of Samples 1 to 11, a ratio $S_1/S_0$ was obtained.

The above-described Table 2 shows the ratios $S_1/S_0$ obtained for respective Samples 1 to 11 (glass plates 1 to 11) as a whole.

Note that, in the measurement for the respective samples, when a luminance of the evaluation spot on the white screen was evaluated, it was found that, for Samples 9 to 11, the luminance of the evaluation spot was lower than a luminance of the reference spot. It was also found that, for Samples 1 to 8, the luminance of the evaluation spot was not so different from the luminance of the reference spot.

As indicated in Table 2, results of measurement show that for Samples 1 to 8, the ratio $S_1/S_0$ was 2.25 or less. It was found that, for Samples 1 to 8 (glass plates 1 to 8), an excellent rectilinearity of light can be obtained in a normal direction to the cut surface of the sample.

For Samples 9 to 11 (glass plates 9 to 11), the ratio $S_1/S_0$ was greater than 2.25. It was found that, for Samples 9 to 11 (glass plates 9 to 11), a rectilinearity of light in a normal direction to the cut surface of the sample was poor.

According to the above-described results of evaluation, as described above, it was confirmed that, for the glass plates 1 to 8, an amount of absorbance contents included in the plate was small, a transparency was great, and an excellent rectilinearity of light can be obtained also in a normal direction to an end surface.

REFERENCE SIGNS LIST

10 display device
20 light source group
21 light source
30 light guide plate
32A first main surface
32B second main surface
34A to 34D end surface
40 display element
100 apparatus
110 laser light source
120 screen
130 sample
140 spot

What is claimed is:

1. A glass plate, having a length of a side L of 200 mm or more and a thickness θ of 1.0 mm or more, provided with first and second main surfaces; and one end surface or a plurality of end surfaces connecting the main surfaces to each other, the glass plate comprising:
   1 weight ppm to 80 weight ppm of iron in a total amount in terms of $Fe_2O_3$, with 0.1 weight ppm to 10.0 weight ppm of $Fe^{2+}$ in terms of $Fe_2O_3$; and
   0.1 weight ppm to 10.0 weight ppm of Ni Mn, Cr, Co and V in total,
   wherein β-OH ($mm^{-1}$) is greater than or equal to 0.015× $[Fe^{2+}]$, where $[Fe^{2-}]$ is an amount of $Fe^{2+}$ (weight ppm) in terms of $Fe_2O_3$, and
   wherein, in a sample "A", obtained by cutting from a central portion of the glass plate in a direction orthogonal to the first main surface, with a size having a length of 50 mm, a width of 50 mm and a thickness of θ, the two main surfaces and first and second cut surfaces that face each other being set to have an arithmetic average roughness Ra of 0.1 μm or less,
   a first average absorbance coefficient, $\alpha_{ave1}$, for a wavelength within a range of 400 nm to 700 nm measured on the first main surface in a normal direction to the first main surface is 0.009 or less, and
   a ratio of a second average absorbance coefficient, $\alpha_{ave2}$, for a wavelength within a range of 400 nm to 700 nm measured on the first cut surface in a direction orthogonal to the normal direction, to the first absorbance coefficient $\alpha_{ave1}$, $\alpha_{ave2}/\alpha_{ave1}$, is 1.3 or less.

2. The glass plate according to claim 1,
   wherein a formula (A)

$$26\times[Ni]+0.5\times[Mn]+13\times[Cr]+85\times[Co]+0.7\times[V]<70$$

is satisfied, where [Ni], [Mn], [Cr], [Co], and [V] are contained amounts (weight ppm) of Ni, Mn, Cr, Co, and V, respectively.

3. The glass plate according to claim 1,
   wherein in a sample "B", obtained by cutting from a central portion of the glass plate in a direction orthogonal to the first main surface, with a size having a longitudinal length of 50 mm, a transverse length of 3 mm and a thickness of θ, the two main surfaces and third and fourth cut surfaces with a longitudinal length of 50 mm that face each other being set to have an arithmetic average roughness Ra of 0.1 μm or less, and
   a standard deviation of a refraction index distribution Δn measured by using a two-beam interference method from the third and fourth cut surfaces is $5.0\times10^{-5}$ or less.

4. The glass plate according to claim 1,
   wherein when a screen of a distance of 160 mm from a laser light source is irradiated with a laser light having a beam diameter that is less than a thickness of the sample "A" from the laser light source, a first spot area $S_0$ is an area of a spot of the laser light formed on the screen,
   when the sample "A" is arranged between the laser light source and the screen at a position of a distance of 40 mm from the laser light source so that the first cut surface of the sample "A" faces the laser light source, a second spot area $S_1$ is an area of a spot of the laser light formed on the screen, and
   a ratio of the second spot area $S_1$ to the first spot area $S_0$, $S_1/S_0$, is 2.25 or less.

5. A glass plate, having a length of a side L of 200 mm or more and a thickness θ of 1.0 mm or more, provided with first and second main surfaces; and one end surface or a plurality of end surfaces connecting the main surfaces to each other, the glass plate comprising:
   1 weight ppm to 80 weight ppm of iron in a total amount in terms of $Fe_2O_3$, with 0.1 weight ppm to 10.0 weight ppm of $Fe^{2+}$ in terms of $Fe_2O_3$;
   0.1 weight ppm to 10.0 weight ppm of Ni, Mn, Cr, Co and V in total; and
   0.1 weight ppm to 500 weight ppm of $CeO_2$,
   wherein, in a sample "A", obtained by cutting from a central portion of the glass plate in a direction orthogonal to the first main surface, with a size having a length of 50 mm, a width of 50 mm and a thickness of θ, the two main surfaces and first and second cut surfaces that face each other being set to have an arithmetic average roughness Ra of 0.1 μm or less,
   a first average absorbance coefficient, $\alpha_{ave1}$, for a wavelength within a range of 400 nm to 700 nm measured on the first main surface in a normal direction to the first main surface is 0.009 or less, and a ratio of a second average absorbance coefficient, $\alpha_{ave2}$, for a wavelength within a range of 400 nm to 700 nm measured on the first cut surface in a direction orthogonal to the normal direction, to the first absorbance coefficient $\alpha_{ave1}$, $\alpha_{ave2}/\alpha_{ave1}$, is 1.3 or less.

6. The glass plate according to claim 1, comprising 0.1 weight ppm to 4.0 weight ppm of $Fe^{2+}$ in terms of $Fe_2O_3$.

7. The glass plate according to claim 1, further comprising 0.1 weight ppm to 500 weight ppm of $CeO_2$.

8. The glass plate according to claim 1, wherein $As_2O_3$ and $Sb_2O_3$ are not substantially included.

9. The glass plate according to claim 1, wherein the glass plate is chamfered between the first main surface or the second main surface and the end surface, or between the end surfaces.

10. A display device or an illuminating device, comprising:
an edge light type light guide plate comprising the glass plate according to claim 1.

11. The glass plate according to claim 5, wherein $\beta$-OH ($mm^{-1}$) is greater than or equal to 0.015×[$Fe^{2+}$], where [$Fe^{2+}$] is an amount of $Fe^{2+}$ (weight ppm) in terms of $Fe_2O_3$.

12. The glass plate according to claim 5, wherein a formula (A)

$$26\times[Ni]+0.5\times[Mn]+13\times[Cr]+85\times[Co]+0.7\times[V]<70 \quad \text{formula (A)}$$

is satisfied, where [Ni], [Mn], [Cr], [Co], and [V] are contained amounts (weight ppm) of Ni, Mn, Cr, Co, and V, respectively.

13. The glass plate according to claim 5, wherein in a sample "B", obtained by cutting from a central portion of the glass plate in a direction orthogonal to the first main surface, with a size having a longitudinal length of 50 mm, a transverse length of 3 mm and a thickness of $\theta$, the two main surfaces and third and fourth cut surfaces with a longitudinal length of 50 mm that face each other being set to have an arithmetic average roughness Ra of 0.1 μm or less, and a standard deviation of a refraction index distribution $\Delta n$ measured by using a two-beam interference method from the third and fourth cut surfaces is $5.0\times10^{-5}$ or less.

14. The glass plate according to claim 5,
wherein when a screen of a distance of 160 mm from a laser light source is irradiated with a laser light having a beam diameter that is less than a thickness of the sample "A" from the laser light source, a first spot area $S_0$ is an area of a spot of the laser light formed on the screen, when the sample "A" is arranged between the laser light source and the screen at a position of a distance of 40 mm from the laser light source so that the first cut surface of the sample "A" faces the laser light source, a second spot area $S_1$ is an area of a spot of the laser light formed on the screen, and a ratio of the second spot area $S_1$ to the first spot area $S_0$, $S_1/S_0$, is 2.25 or less.

15. The glass plate according to claim 5, comprising 0.1 weight ppm to 4.0 weight ppm of $Fe^{2+}$ in terms of $Fe_2O_3$.

16. The glass plate according to claim 5, wherein $As_2O_3$ and $Sb_2O_3$ are not substantially included.

17. The glass plate according to claim 5, wherein the glass plate is chamfered between the first main surface or the second main surface and the end surface, or between the end surfaces.

18. A display device or an illuminating device, comprising:
an edge light type light guide plate comprising the glass plate according to claim 5.

* * * * *